US009554498B2

(12) United States Patent
Sudbrink et al.

(10) Patent No.: US 9,554,498 B2
(45) Date of Patent: *Jan. 31, 2017

(54) LARGE FIELD CULTIVATOR NARROW FOLD

(71) Applicant: CNH Industrial America LLC, New Holland, PA (US)

(72) Inventors: Matthew R. Sudbrink, Metamora, IL (US); Daniel Scott Valandingham, Waterloo, IA (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/528,745

(22) Filed: Oct. 30, 2014

(65) Prior Publication Data

US 2015/0156958 A1 Jun. 11, 2015

Related U.S. Application Data

(60) Provisional application No. 61/914,502, filed on Dec. 11, 2013.

(51) Int. Cl.
*A01B 73/06* (2006.01)
*A01B 29/04* (2006.01)
*A01B 73/04* (2006.01)

(52) U.S. Cl.
CPC ........... *A01B 29/048* (2013.01); *A01B 73/044* (2013.01); *A01B 73/065* (2013.01)

(58) Field of Classification Search
CPC ..... A01B 73/02; A01B 73/048; A01B 73/065; A01B 73/005; A01B 73/00; A01B 73/06; A01B 73/067

See application file for complete search history.

(56) References Cited

U.S. PATENT DOCUMENTS

| 2,828,680 | A |   | 4/1958  | Johnson |
|-----------|---|---|---------|---------|
| 3,588,139 | A |   | 6/1971  | Bayne |
| 3,880,241 | A |   | 4/1975  | Vincent |
| 4,126,187 | A | * | 11/1978 | Schreiner ............. A01B 73/067 172/311 |
| 4,320,805 | A |   | 3/1982  | Winter |
| 4,355,689 | A |   | 10/1982 | Friggstad |

(Continued)

OTHER PUBLICATIONS

"Planning Guide to Farm Machinery Storage", Samuel D. Parsons et al., AE-115, Purdue University Cooperative Extension Service, Apr. 22, 2010 (22 pages).

*Primary Examiner* — Matthew D Troutman
(74) *Attorney, Agent, or Firm* — Rebecca L. Henkel; Rickard K. DeMille

(57) ABSTRACT

An agricultural implement including a main frame having a pull hitch tube extending in a travel direction and a main frame tool bar coupled with and extending transverse to the pull hitch tube, and a plurality of pivotal wings coupled with the main frame. Each of the plurality of wings have at least one pivotal wing front section and at least one pivotal wing rear section. The pivotal wing front sections and the pivotal wing rear sections pivot from a generally horizontal position to a generally vertical position, and the wings fold from a perpendicular position to a position parallel with the pull hitch tube.

18 Claims, 6 Drawing Sheets

(56) References Cited

U.S. PATENT DOCUMENTS

| | | | | |
|---|---|---|---|---|
| 4,418,762 A * | 12/1983 | Page | | A01B 73/02 |
| | | | | 172/311 |
| 4,619,330 A | 10/1986 | Machnee | | |
| 4,821,809 A | 4/1989 | Summach et al. | | |
| 4,840,233 A | 6/1989 | Friggstad et al. | | |
| 5,911,625 A | 6/1999 | von Allwörden | | |
| 6,076,613 A | 6/2000 | Frasier | | |
| 6,112,827 A | 9/2000 | Reiber et al. | | |
| 6,141,612 A * | 10/2000 | Flamme | | A01B 63/1117 |
| | | | | 111/177 |
| 6,263,977 B1 | 7/2001 | Mayerle et al. | | |
| 6,269,887 B1 | 8/2001 | Friggstad | | |
| 6,371,215 B2 | 4/2002 | Friggstad | | |
| 6,374,922 B1 | 4/2002 | Friggstad | | |
| 6,374,923 B1 | 4/2002 | Friggstad | | |
| 6,415,873 B1 * | 7/2002 | Hudgins | | A01B 35/16 |
| | | | | 172/311 |
| 6,550,543 B1 | 4/2003 | Friggstad | | |
| 7,469,648 B2 | 12/2008 | Bettin | | |
| 7,581,597 B2 * | 9/2009 | Neudorf | | A01B 73/067 |
| | | | | 172/1 |
| 7,604,068 B1 * | 10/2009 | Friesen | | A01B 73/065 |
| | | | | 172/311 |
| 7,926,247 B2 | 4/2011 | Van Den Engel | | |
| 8,118,110 B2 | 2/2012 | Tamm et al. | | |
| 8,141,653 B2 * | 3/2012 | Ryder | | A01B 73/067 |
| | | | | 172/311 |
| 8,209,946 B2 | 7/2012 | Neudorf et al. | | |
| 8,342,256 B2 | 1/2013 | Adams et al. | | |
| 8,567,517 B2 * | 10/2013 | Friggstad | | A01B 63/32 |
| | | | | 172/140 |
| 8,794,344 B2 * | 8/2014 | Blunier | | A01B 63/32 |
| | | | | 111/200 |
| 2005/0087350 A1 * | 4/2005 | Bauer | | A01C 7/208 |
| | | | | 172/311 |
| 2007/0240889 A1 * | 10/2007 | Neudorf | | A01B 73/067 |
| | | | | 172/311 |
| 2011/0284252 A1 * | 11/2011 | Friggstad | | A01B 63/32 |
| | | | | 172/310 |
| 2011/0290513 A1 * | 12/2011 | Yuen | | A01B 73/048 |
| | | | | 172/459 |
| 2014/0034342 A1 * | 2/2014 | Friggstad | | A01B 73/067 |
| | | | | 172/663 |
| 2014/0069670 A1 * | 3/2014 | Friesen | | A01B 73/02 |
| | | | | 172/311 |

\* cited by examiner

LARGE FIELD CULTIVATOR NARROW FOLD

CROSS REFERENCE TO RELATED APPLICATION

This is a non-provisional application based upon U.S. provisional patent application Ser. No. 61/914,502 entitled "TILLAGE IMPLEMENT WITH FOLDABLE SHANK FRAME", filed Dec. 11, 2013, which is incorporated herein by reference.

BACKGROUND OF THE INVENTION

1. Field of the Invention

The present invention relates to agricultural implements, and, more particularly, to agricultural tillage implements or field cultivators.

2. Description of the Related Art

Farmers utilize a wide variety of agricultural implements to prepare soil for planting. Some such agricultural implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof.

As agricultural implements become wider and wider over time, it becomes more difficult to keep the transport size of the agricultural implement within manageable limits. It also becomes more difficult to convert the agricultural implement from an operating configuration to a transport configuration, or vice versa, without requiring too much time and difficulty on the part of the operator. It is desirable for the agricultural implement to be converted from one mode to the other while the operator remains within the operator cab, through the use of hydraulics or other actuators. It is also desirable for the agricultural implement to remain within certain geometric constraints so that it is not necessary to use a separate "escort vehicle" or the like when traveling on public roads.

SUMMARY OF THE INVENTION

The present invention provides an agricultural implement with wings that are foldable to a compact transport configuration.

The invention in one form is directed to an agricultural implement including a main frame having a pull hitch tube extending in a travel direction, and a pair of pivotally coupled wings coupled about generally vertical axes with the main frame. The pair of pivotally coupled wings can be pivoted forward about the generally vertical axes to positions adjacent to and generally parallel with the pull hitch tube when in a transport configuration, or may be pivoted outward about the generally vertical axes to positions perpendicular to the pull hitch tube when in an operating configuration. Each of the pivotally coupled wings has a plurality of wing front sections pivotally coupled to it, which wing front section may be pivoted to a generally vertical position when in the transport configuration, or may be pivoted to a generally horizontal position when in the operating configuration. Each of the pivotally coupled wings also has a plurality of wing rear sections pivotally coupled to it, which wing rear section may be pivoted to a generally vertical position when in the transport configuration, or may be pivoted to a generally horizontal position when in the operating configuration.

The invention in another form is directed to an agricultural implement including a main frame having a pull hitch tube extending in a travel direction and a set of inner wing segments attached to the main frame. A plurality of pivotally coupled additional wing segments are coupled about generally vertical axes with the inner wing segments. The plurality of pivotally coupled additional wing segments can be pivoted forward about the generally vertical axes to positions generally parallel with the pull hitch tube when in a transport configuration, or may be pivoted outward about the generally vertical axes to positions perpendicular to the pull hitch tube when in an operating configuration. Each of the pivotally coupled additional wing segments has a wing front section pivotally coupled to it, which wing front section may be pivoted to a generally vertical position when in the transport configuration, or may be pivoted to a generally horizontal position when in the operating configuration. Each of the pivotally coupled additional wing segments also has a wing rear section pivotally coupled to it, which wing rear section may be pivoted to a generally vertical position when in the transport configuration, or may be pivoted to a generally horizontal position when in the operating configuration.

The invention in yet another form is directed to a wing for an agricultural implement including a plurality of wing tool bar segments, a plurality of wing front sections, and a plurality of wing rear sections. Each of the wing front sections may be pivoted to a generally vertical position when in a transport configuration, or may be pivoted to a generally horizontal position when in an operating configuration. Similarly, each of the wing rear sections may be pivoted to a generally vertical position when in the transport configuration, or may be pivoted to a generally horizontal position when in the operating configuration.

An advantage of the present invention is that the agricultural implement may be quickly and efficiently reconfigured from the operating configuration to the transport configuration.

Another advantage is that the transport configuration of the agricultural implement is kept within manageable limits while still allowing for the desired width and functionality of the agricultural implement when in the operating configuration.

Another advantage is that reconfiguring the agricultural implement from the operating configuration to the transport configuration and vice versa is accomplished without excessive time and difficulty on the part of the operator, and without requiring the operator to exit the operator cab.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 5 further shows the generally longitudinal axes about which the wing segments articulate vertically when following ground contours.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
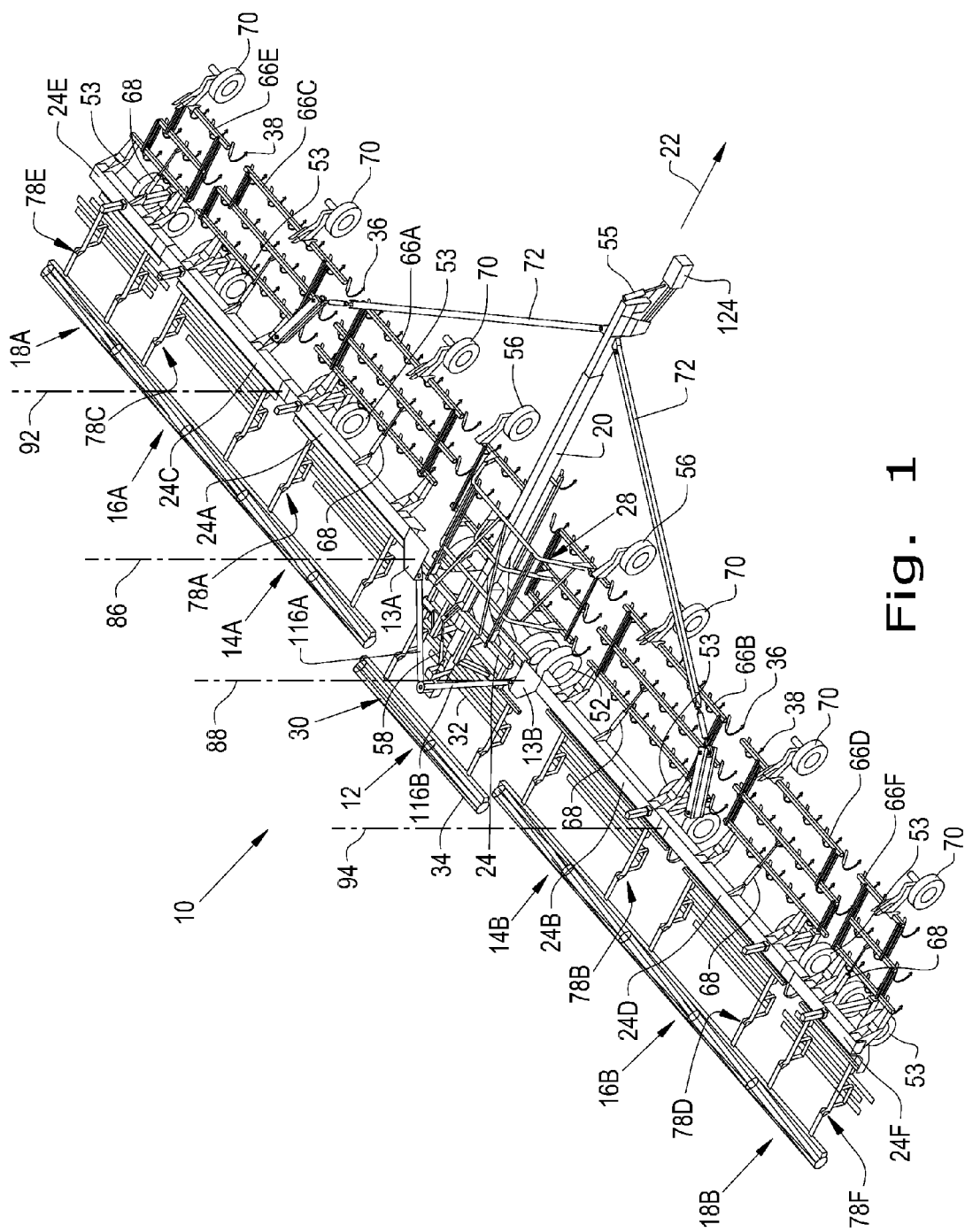
FIG. 1 is a top perspective view of an embodiment of an agricultural implement of the present invention, in the form of a field cultivator, with wing front sections and wing rear sections pivoted to generally horizontal positions in the operating configuration.
Figure 2:
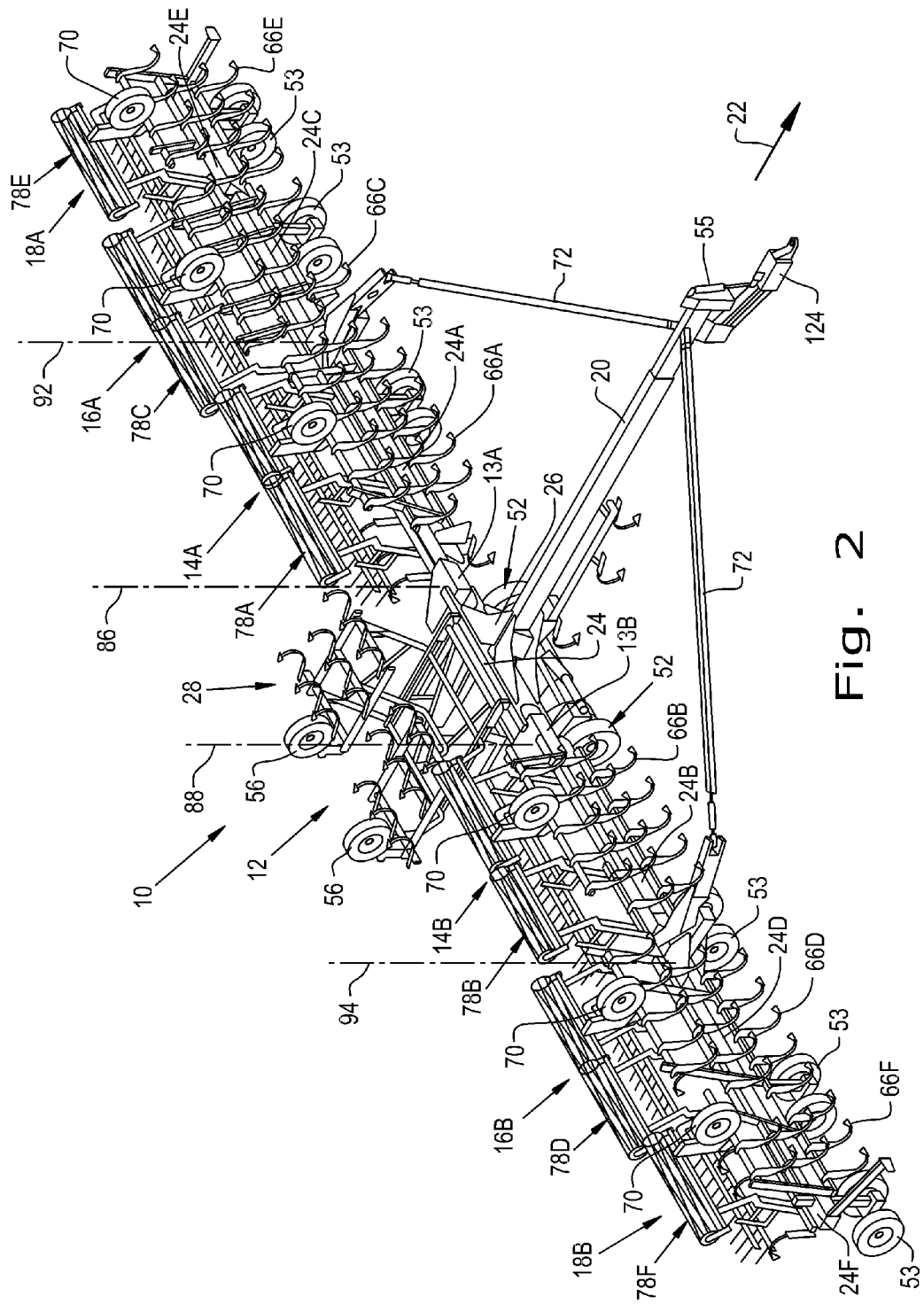
FIG. 2 is the same top perspective view shown in FIG. 1, with wing front sections and wing rear sections pivoted to generally vertical positions.

Referring now to the drawings, and more particularly FIGS. 1 through 4, there is shown an embodiment of an agricultural implement of the present invention. In the illustrated embodiment, the agricultural implement 10 is configured as a multi-section field cultivator for tilling and finishing soil prior to seeding, and includes a main frame 12 and a plurality of wing segments 14A, 14B, 16A, 16B, 18A, and 18B. The left wing segments are designated 14A, 16A and 18A, and the right wing segments are designated 14B, 16B and 18B. Wing segments 14A and 14B are each inner wing segments, wing segments 16A and 16B are each middle wing segments, and wing segments 18A and 18B are each outer wing segments. Each wing segment 14A, 14B, 16A, 16B, 18A, and 18B may be provided with a tool bar segment, so that left inner wing segment 14A is provided with left inner tool bar segment 24A, right inner wing segment 14B is provided with right inner tool bar segment 24B, left middle wing segment 16A is provided with left middle tool bar segment 24C, right middle wing segment 16B is provided with right middle tool bar segment 24D, left outer wing segment 18A is provided with left outer tool bar segment 24E, and right outer wing segment 18B is provided with right outer tool bar segment 24F. Intermediate wings 13A and 13B may be attached to main frame 12, and may provide generally vertical axes 86 and 88 about which the plurality of wing segments 14A, 14B, 16A, 16B, 18A, and 18B pivot. Alternately, inner wing segments 14A and 14B may not pivot about vertical axes 86 and 88, and may instead remain fixed in positions perpendicular to main frame 12, while middle wing segments 16A and 16B and outer wing segments 18A and 18B pivot about generally vertical axes 92 and 94 located at outer ends of inner wing segments 14A and 14B.

Main frame 12 is the center section that is directly towed by a traction unit, such as an agricultural tractor (not shown). Main frame 12 includes a pull hitch tube 20 extending in a travel direction 22, and a main frame tool bar 24 which is coupled with and extends transverse to pull hitch tube 20. Reinforcing gusset plates 26 may be used to strengthen the connection between pull hitch tube 20 and main frame tool bar 24. Main frame 12 may function to carry a main shank frame 28 for tilling the soil, and a main rear auxiliary implement 30 for finishing the soil. Main rear auxiliary implement 30 may include a spring tooth drag 32 and a rolling (aka, crumbler) basket 34 which coact with each other to finish the soil. However, main rear auxiliary implement 30 can be differently configured, such as a spike tooth drag, cultivator shanks, etc. Main shank frame 28 may be pivotally coupled with main frame tool bar 24, so that it may be positioned in front of the main frame tool bar 24 when in an operating configuration, and may be foldable up and over the main frame tool bar 24 to a position rearward of main frame tool bar 24 when in a transport configuration. Main shank frame 28 may also include one or more gauge wheel assemblies 56. A hydraulic cylinder 58 may be used to fold main shank frame 28 from the operating configuration to the transport configuration, and vice versa.

Each of the plurality of wing segments 14A, 14B, 16A, 16B, 18A, and 18B carries a wing front section, so that left inner wing segment 14A is provided with left inner wing front section 66A, right inner wing segment 14B is provided with right inner wing front section 66B, left middle wing segment 16A is provided with left middle wing front section 66C, right middle wing segment 16B is provided with right middle wing front section 66D, left outer wing segment 18A is provided with left outer wing front section 66E, and right outer wing segment 18B is provided with right outer wing front section 66F. Each wing front section 66A, 66B, 66C, 66D, 66E, and 66F is foldable upwards to a generally vertical position using hydraulic cylinders 68, and is lockable in the generally vertical position, when in the transport configuration. Each wing front section 66A, 66B, 66C, 66D, 66E, and 66F is further foldable downwards to a generally horizontal position when in the operating configuration. Hydraulic cylinders 68 may optionally be placed in a "float mode" such that gauge wheel assemblies 70 at the front of wing front sections 66A, 66B, 66C, 66D, 66E, and 66F are operable to float up and down as they traverse across a field and thereby set the operating depth at the front edge of wing front sections 66A, 66B, 66C, 66D, 66E, and 66F. In the embodiment shown, each of wing front sections 66A, 66B, 66C, 66D, 66E, and 66F are shank frames having cultivator shanks 36 with shovels 38 at their lower ends for tilling the soil.

Each of the plurality of wing segments 14A, 14B, 16A, 16B, 18A, and 18B also carries a wing rear section, so that left inner wing segment 14A is provided with left inner wing rear section 78A, right inner wing segment 14B is provided with right inner wing rear section 78B, left middle wing segment 16A is provided with left middle wing rear section 78C, right middle wing segment 16B is provided with right middle wing rear section 78D, left outer wing segment 18A is provided with left outer wing rear section 78E, and right outer wing segment 18B is provided with right outer wing rear section 78F. Each wing rear section 78A, 78B, 78C, 78D, 78E, and 78F is foldable upwards to a generally vertical position, and is lockable in the generally vertical position, when in the transport configuration. Each wing rear section 78A, 78B, 78C, 78D, 78E, and 78F is further foldable downwards to a generally horizontal position when in the operating configuration. Wing rear sections 78A, 78B, 78C, 78D, 78E, and 78F may optionally be placed in a "float mode" such that they are operable to float up and down as they traverse across a field. In the embodiment shown, each of wing rear sections 78A, 78B, 78C, 78D, 78E, and 78F are auxiliary implements, which may include spring tooth drags, crumbler baskets, spike tooth drags, cultivator shanks, or any combination thereof.

During use, it is periodically necessary to move the agricultural implement 10 from an unfolded (operating) configuration to a folded (transport) configuration. A hydraulic cylinder (not shown) may first be actuated to lift the main frame 12 to the raised transport configuration using rear lift wheels 52 in cooperation with hydraulic cylinder 55 connected to pull hitch 124. Toolbar lift wheels 53 may lift wing segments 14A, 14B, 16A, 16B, 18A, and 18B to the raised transport position along with main frame 12, which toolbar lift wheels 53 may then be allowed to caster or pivot. Hydraulic cylinder 58 may then actuated to fold main shank frame 28 up and over main frame tool bar 24 to an inverted position rearward of main frame tool bar 24. Crumbler basket 34 of main rear auxiliary implement 30 may then also be moved to a raised position.

Then wing front sections 66A, 66B, 66C, 66D, 66E, and 66F of the wing segments 14A, 14B, 16A, 16B, 18A, and 18B are folded upwards to the generally vertical position and locked. Wing front sections 66A, 66B, 66C, 66D, 66E, and 66F of the wing segments 14A, 14B, 16A, 16B, 18A, and 18B may be folded upwards to the generally vertical position at the same time, or may be folded upwards to the generally vertical position sequentially. Wing rear sections 78A, 78B, 78C, 78D, 78E, and 78F are also folded upwards to the generally vertical position and locked. Similarly, wing rear sections 78A, 78B, 78C, 78D, 78E, and 78F may be folded upwards to the generally vertical position at the same time, or may be folded upwards to the generally vertical position sequentially.

Figure 3:
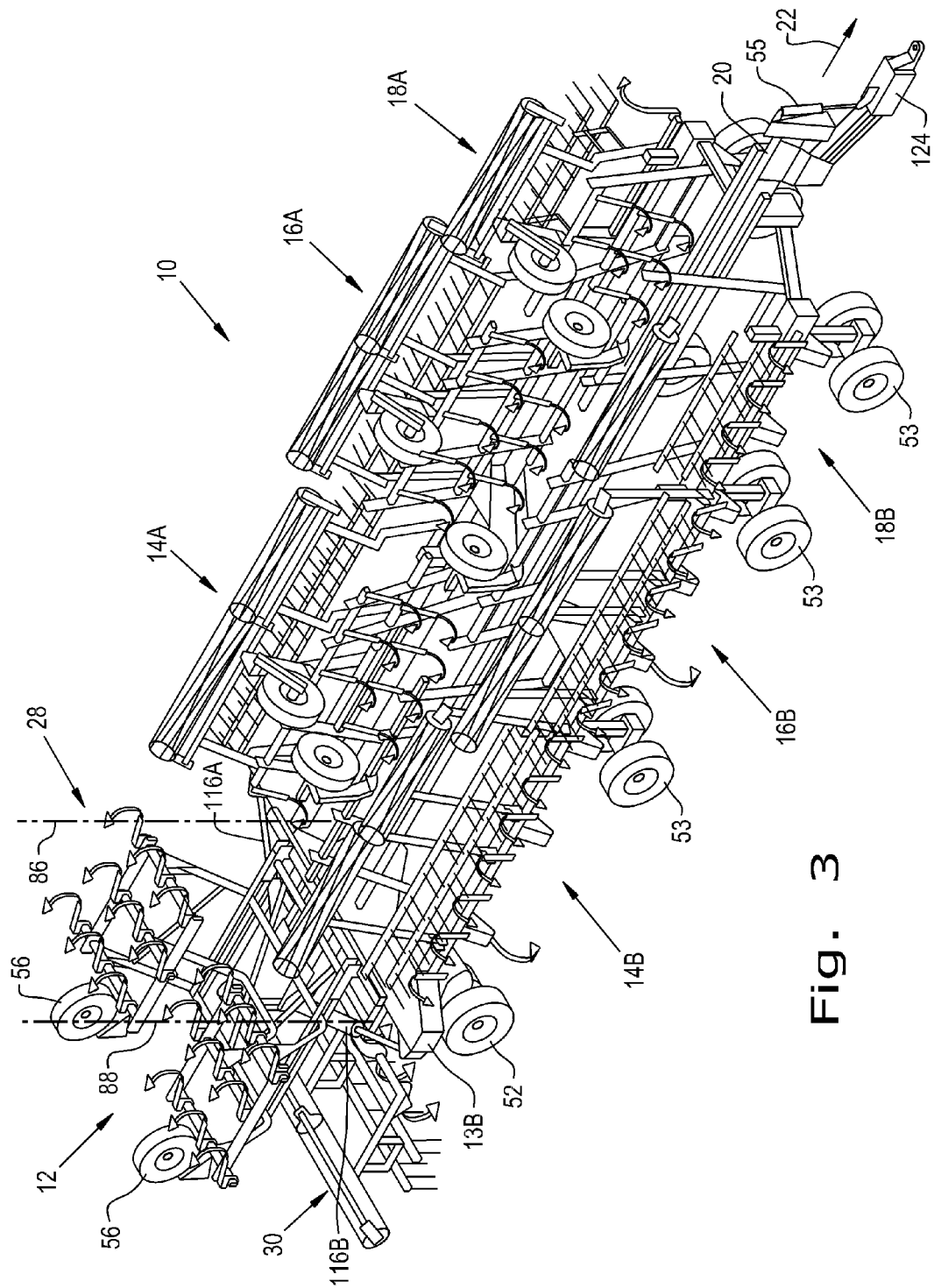
FIG. 3 is a top perspective view of the agricultural implement shown in FIGS. 1-2, with the wings folded forward to a transport configuration.
Figure 4:
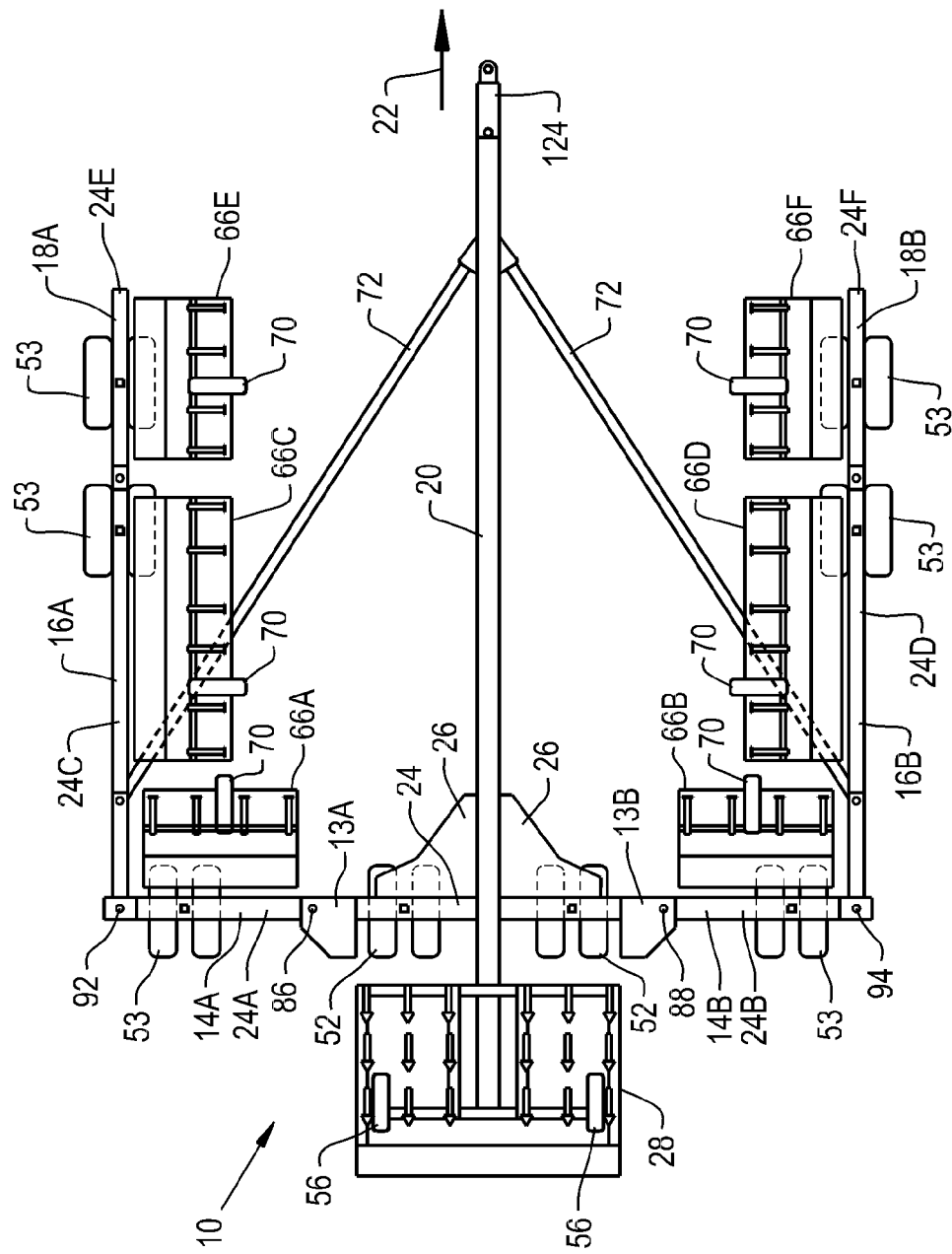
FIG. 4 is a top perspective view of an alternate embodiment of the agricultural implement shown in FIGS. 1-3, with the middle and outer wing segments folded forward to a transport configuration.

Diagonally angled draft tubes 72 extending between pull hitch tube 20 and a respective tool bar 24C and 24D associated with the pair of middle wing segments 16A and 16B are then folded inward, and wing segments 14A, 14B, 16A, 16B, 18A, and 18B are then folded forward by left main fold hydraulic cylinder 116A and right main fold hydraulic cylinder 116B about generally vertical axes 86 and 88 which pass through intermediate wings 13A and 13B to a position adjacent to and generally parallel with pull hitch tube 20 (FIG. 3). Alternately, only middle wing segments 16A and 16B and outer wing segments 18A and 18B may fold forward about generally vertical axes 92 and 94 located at outer ends of inner wing segments 14A and 14B. Gauge wheel assemblies 56 at the front of main shank frame 28 and gauge wheel assemblies 70 at the front of wing front sections 66A, 66B, 66C, 66D, 66E, and 66F are all configured as caster wheels and are not in contact with the ground when agricultural implement 10 is in the folded or transport configuration. For unfolding the agricultural implement 10 to the operating configuration, the reverse folding sequence is carried out.

Figure 5:
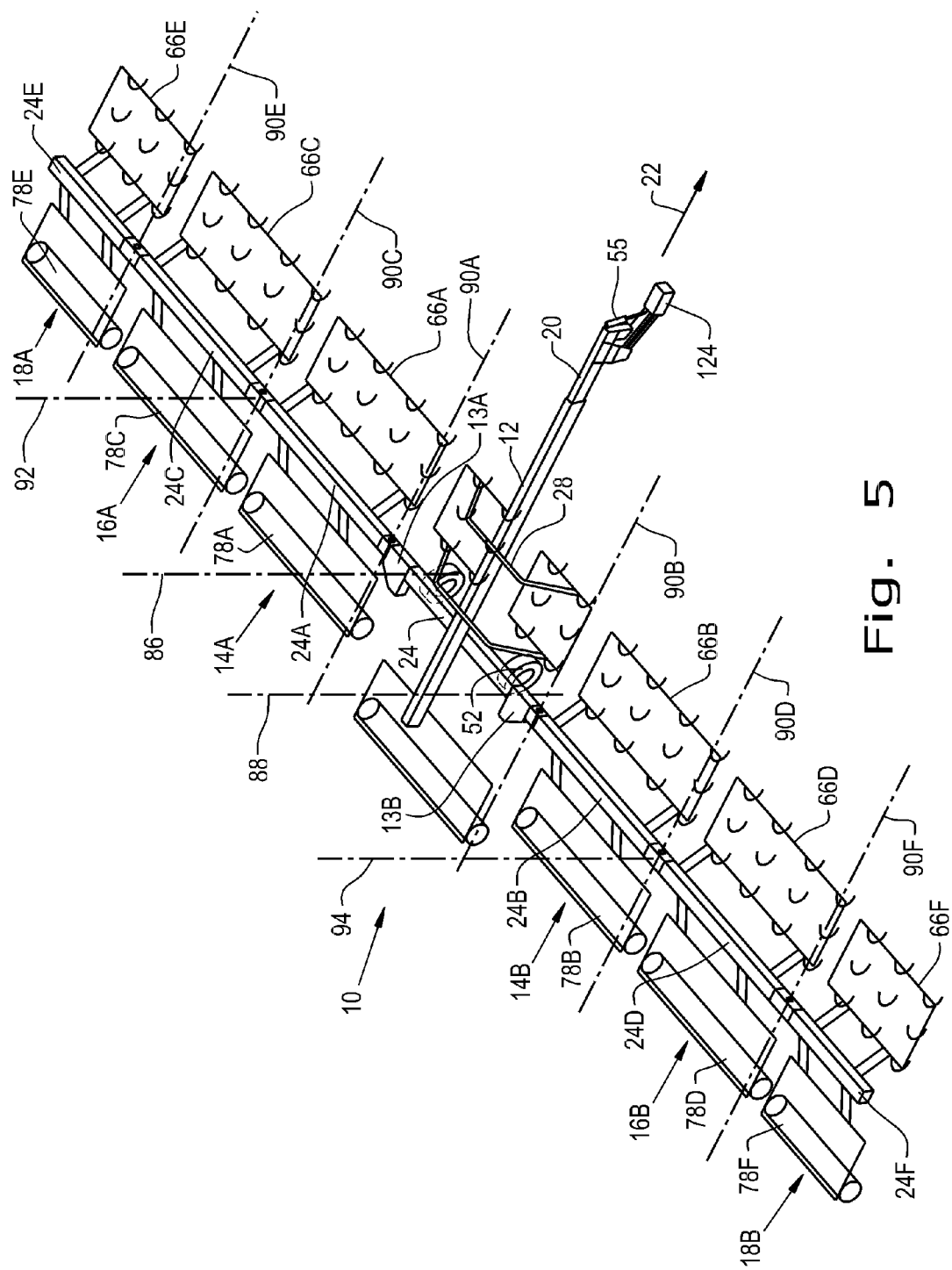
FIG. 5 is a simplified top perspective view similar to FIG. 1, showing a set of generally vertical axes about which the entire wings fold forward when placed in the transport configuration and an alternate set of generally vertical axes about which only a portion of the wings fold forward when placed in the transport configuration.
Figure 6:
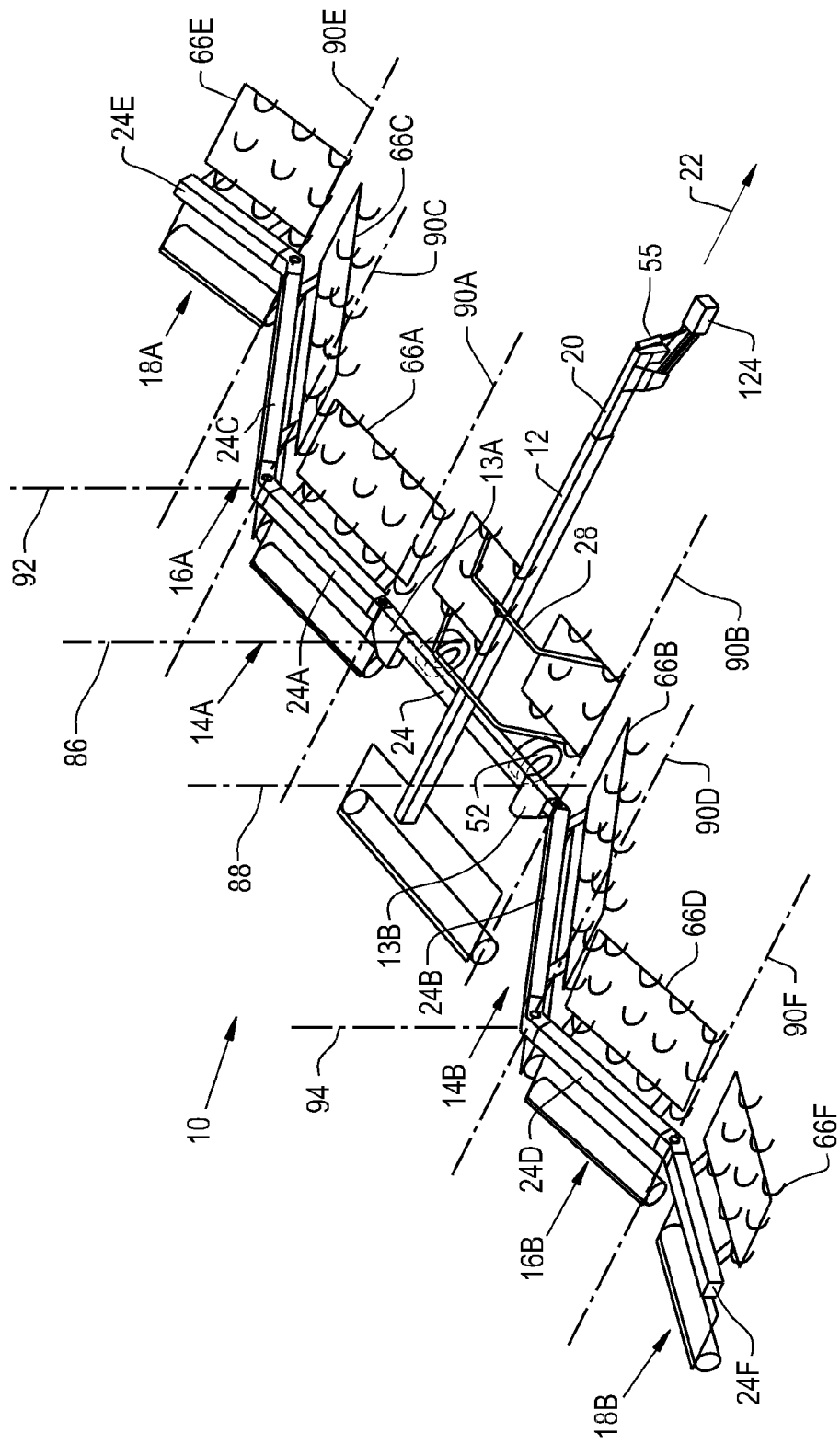
FIG. 6 is the same top perspective view shown in FIG. 5 with the generally longitudinal axes, showing the wing segments articulating vertically.

FIGS. 5 and 6 show simplified views of the main frame 12 of the agricultural implement 10 with pull hitch tube 20. Main shank frame 28 is shown in its operating configuration and is positioned down and forward of main frame tool bar 24. Left inner wing segment 14A is provided with left inner tool bar segment 24A, and is connected to main frame 12 at left intermediate wing 13A and can pivot about left generally vertical axis 86 and left inner longitudinal axis 90A. Right inner wing segment 14B is provided with right inner tool bar segment 24B, and is connected to main frame 12 at right intermediate wing 13B and can pivot about right generally vertical axis 88 and right inner longitudinal axis 90B. Left middle wing segment 16A is provided with left middle tool bar segment 24C, and is connected to left inner wing segment 14A and can pivot about left middle longitudinal axis 90C. Right middle wing segment 16B is provided with right middle tool bar segment 24C, and is connected to right inner wing segment 14B and can pivot about right middle longitudinal axis 90D. Left outer wing segment 18A is provided with left outer tool bar segment 24E, and is connected to left middle wing segment 16A and can pivot about left outer longitudinal axis 90E. Right outer wing segment 18B is provided with right outer tool bar segment 24F, and is connected to right middle wing segment 16B and can pivot about right outer longitudinal axis 90F. In this way, wing segments 14A, 14B, 16A, 16B, 18A, and 18B can articulate vertically to follow ground contours and can further pivot forward to a position adjacent to and generally parallel with pull hitch tube 20 or can pivot outward to a position generally perpendicular to pull hitch tube 20.

In an alternate embodiment, left and right inner wing segments 14A and 14B are connected to main frame 12 such that they pivot about left inner longitudinal axis 90A and right inner longitudinal axis 90B, respectively, but do not pivot about left generally vertical axis 86 and right generally vertical axis 88. Instead, left middle wing segment 16A pivots about generally vertical axis 92 at the end of left inner wing segment 14A as well as about left middle longitudinal axis 90C, and right middle wing segment 16B pivots about generally vertical axis 94 at the end of right inner wing segment 14B as well as about right middle longitudinal axis 90D. Again, left outer wing segment 18A pivots about left outer longitudinal axis 90E and right outer wing segment 18B pivots about right outer longitudinal axis 90F. In this way, wing segments 14A, 14B, 16A, 16B, 18A, and 18B can still articulate vertically to follow ground contours, while only middle and outer wing segments 16A, 16B, 18A, and 18B pivot forward to a position generally parallel with pull hitch tube 20 or outward to the position generally perpendicular to pull hitch tube 20.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement, comprising:
   a main frame including a pull hitch tube extending in a travel direction;
   at least one wing pivotally coupled with said main frame about at least one generally vertical axis, said at least one wing operable to pivot forward about said at least one generally vertical axis to a position adjacent to and generally parallel with said pull hitch tube when the agricultural implement is in a transport configuration, said at least one wing operable to pivot outward about said at least one generally vertical axis to a position perpendicular to said pull hitch tube when the agricultural implement is in an operating configuration; and at least one wing front section pivotally attached to said at least one wing, said at least one wing front section operable to pivot to a generally vertical position when the agricultural implement is in said transport configuration and operable to pivot to a generally horizontal working position forward of said at least one wing in said travel direction when the agricultural implement is in said operating configuration.

2. The agricultural implement of claim 1, further comprising:

at least one wing rear section pivotally attached to said at least one wing, said at least one wing rear section operable to pivot to a generally vertical position when the agricultural implement is in said transport configuration and operable to pivot to a generally horizontal working position rearward of said at least one wing opposite to said travel direction when the agricultural implement is in said operating configuration.

3. The agricultural implement of claim 2, wherein:

said main frame further includes a main frame tool bar attached to and extending transverse to said pull hitch tube; and said at least one wing further includes at least one wing tool bar.

4. The agricultural implement of claim 3, wherein:

said at least one wing is further operable to articulate vertically about said main frame;

said at least one wing front section has a float mode; and said at least one wing rear section has a float mode.

5. The agricultural implement of claim 4, wherein:

said at least one wing further includes at least one left wing, including a left inner wing segment, a left middle wing segment, and a left outer wing segment;

said at least one wing further includes at least one right wing, including a right inner wing segment, a right middle wing segment, and a right outer wing segment;

said at least one generally vertical axis further includes at least one left generally vertical axis and at least one right generally vertical axis;

said at least one wing front section further includes at least one left wing front section, including a left inner wing front section, a left middle wing front section, and a left outer wing front section;

said at least one wing front section further includes at least one right wing front section, including a right inner wing front section, a right middle wing front section, and a right outer wing front section;

said at least one wing rear section further includes at least one left wing rear section, including a left inner wing rear section, a left middle wing rear section, and a left outer wing rear section;

said at least one wing rear section further includes at least one right wing rear section, including a right inner wing rear section, a right middle wing rear section, and a right outer wing rear section;

said at least one wing tool bar further includes at least one left wing tool bar, including a left inner wing tool bar segment, a left middle wing tool bar segment, and a left outer wing tool bar segment; and said at least one wing tool bar further includes at least one right wing tool bar, including a right inner wing tool bar segment, a right middle wing tool bar segment, and a right outer wing tool bar segment.

6. The agricultural implement of claim 5, wherein:

said left middle wing segment is further operable to articulate vertically about said left inner wing segment;

said left outer wing segment is further operable to articulate vertically about said left middle wing segment;

said right middle wing segment is further operable to articulate vertically about said right inner wing segment; and said right outer wing segment is further operable to articulate vertically about said right middle wing segment.

7. The agricultural implement of claim 6, wherein:

said left inner wing front section, said left middle wing front section, said left outer wing front section, said right inner wing front section, said right middle wing front section, and said right outer wing front section further comprise shank frames; and said left inner wing rear section, said left middle wing rear section, said left outer wing rear section, said right inner wing rear section, said right middle wing rear section, and said right outer wing rear section further comprise auxiliary implements.

8. An agricultural implement, comprising:

a main frame including a pull hitch tube extending in a travel direction;

at least one inner wing segment attached to said main frame;

at least one additional wing segment pivotally coupled with said at least one inner wing segment about at least one generally vertical axis located at an outer end of said at least one inner wing segment, said at least one additional wing segment being operable to pivot forward about said at least one generally vertical axis to a position generally parallel with said pull hitch tube when the agricultural implement is in a transport configuration, said at least one additional wing segment being further operable to pivot outward about said at least one generally vertical axis to a position perpendicular to said pull hitch tube when the agricultural implement is in an operating configuration; and at least one wing front section pivotally attached to said at least one additional wing segment, said at least one wing front section operable to pivot to a generally vertical position when the agricultural implement is in said transport configuration and operable to pivot to a generally horizontal working position forward of said at least one additional wing segment in said travel direction when the agricultural implement is in said operating configuration.

9. The agricultural implement of claim 8, further comprising:

at least one wing rear section pivotally attached to said at least one additional wing segment, said at least one wing rear section operable to pivot to a generally vertical position when the agricultural implement is in said transport configuration and operable to pivot to a generally horizontal working position rearward of said at least one wing opposite to said travel direction when the agricultural implement is in said operating configuration.

10. The agricultural implement of claim 9, wherein:

said main frame further includes a main frame tool bar attached to and extending transverse to said pull hitch tube;

said at least one inner wing segment further includes at least one inner wing tool bar segment; and said at least one additional wing segment further includes at least one additional wing tool bar segment.

11. The agricultural implement of claim 10, wherein:

said at least one inner wing segment is operable to articulate vertically about said main frame; and said at least one additional wing segment is operable to articulate vertically about said at least one inner wing segment.

12. The agricultural implement of claim 11, wherein:

said at least one additional wing front section has a float mode; and said at least one additional wing rear section has a float mode.

13. The agricultural implement of claim 12, wherein:

said at least one inner wing segment further includes a left inner wing segment and a right inner wing segment;

said at least one additional wing segment further includes at least one left additional wing segment, including a left middle wing segment and a left outer wing segment;

said at least one additional wing segment further includes least one right additional wing segment, including a right middle wing segment and a right outer wing segment;

said at least one generally vertical axis located at an outer end of said at least one inner wing segment further includes a left generally vertical axis located at an outer end of said left inner wing segment and a right generally vertical axis located at an outer end of said right inner wing segment;

said at least one wing front section further includes at least one left wing front section, including a left middle wing front section and a left outer wing front section;

said at least one wing front section further includes at least one right wing front section, including a right middle wing front section and a right outer wing front section;

said at least one wing rear section further includes at least one left wing rear section, including a left middle wing rear section and a left outer wing rear section; and said at least one wing rear section further includes at least one right wing rear section, including a right middle wing rear section and a right outer wing rear section.

14. The agricultural implement of claim 13, wherein:

said left middle wing front section, said left outer wing front section, said right middle wing front section, and said right outer wing front section further comprise shank frames; and said left middle wing rear section, said left outer wing rear section, said right middle wing rear section, and said right outer wing rear section further comprise auxiliary implements.

15. A wing for an agricultural implement, comprising:

at least one wing tool bar segment;

at least one wing front section pivotally attached to said at least one wing tool bar segment, said at least one wing front section operable to pivot to a generally vertical position when the agricultural implement is in a transport configuration and operable to pivot to a generally horizontal working position forward of said at least one wing in said travel direction when the agricultural implement is in an operating configuration; and at least one wing rear section pivotally attached to said at least one wing tool bar segment, said at least one wing rear section operable to pivot to a generally vertical position when the agricultural implement is in said transport configuration and operable to pivot to a generally horizontal working position rearward of said at least one wing opposite to said travel direction when the agricultural implement is in said operating configuration.

16. The wing for an agricultural implement of claim 15, wherein:

said at least one wing front section has a float mode; and said at least one wing rear section has a float mode.

17. The wing for an agricultural implement of claim 16, wherein:

said at least one wing tool bar segment further includes an inner wing toolbar segment, a middle wing toolbar segment, and an outer wing toolbar segment;

said at least one wing front section further includes an inner wing front section, a middle wing front section, and an outer wing front section; and said at least one wing rear section further includes an inner wing rear section, a middle wing rear section, and an outer wing rear section.

18. The wing for an agricultural implement of claim 17, wherein:

said inner wing front section, said middle wing front section, and said outer wing front section further comprise shank frames; and said inner wing rear section, said middle wing rear section, and said outer wing rear section further comprise auxiliary implements.

* * * * *